(12) United States Patent
Okamoto et al.

(10) Patent No.: US 8,065,145 B2
(45) Date of Patent: Nov. 22, 2011

(54) KEYWORD OUTPUTTING APPARATUS AND METHOD

(75) Inventors: Masayuki Okamoto, Kawasaki (JP); Masaaki Kikuchi, Fuchu (JP); Kazuyuki Goto, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 911 days.

(21) Appl. No.: 12/055,030

(22) Filed: Mar. 25, 2008

(65) Prior Publication Data

US 2008/0319746 A1    Dec. 25, 2008

(30) Foreign Application Priority Data

Jun. 25, 2007  (JP) ................. 2007-166714

(51) Int. Cl.
*G10L 15/06* (2006.01)
(52) U.S. Cl. ...................................... 704/245
(58) Field of Classification Search .................... 704/245
See application file for complete search history.

(56) References Cited

U.S. PATENT DOCUMENTS

| | | | |
|---|---|---|---|
| 5,819,258 A * | 10/1998 | Vaithyanathan et al. | 707/692 |
| 7,607,083 B2 * | 10/2009 | Gong et al. | 715/254 |
| 2008/0033938 A1 | 2/2008 | Okamoto et al. | 707/5 |

FOREIGN PATENT DOCUMENTS

JP    2001-325272    11/2001

OTHER PUBLICATIONS http://kizasi.jp/, Jul. 26, 2006, 4 pps.

* cited by examiner

*Primary Examiner* — Jakieda Jackson
(74) *Attorney, Agent, or Firm* — Ohlandt, Greeley, Ruggiero & Perle, L.L.P.

(57) ABSTRACT

A keyword analysis device obtains word vectors represented by the documents by analyzing keywords contained in each of documents input in a designated period. A topic cluster extraction device extracts topic clusters belonging to the same topic from a plurality of documents. A keyword extraction device extracts, as a characteristic keyword group, a predetermined number of keywords from the topic cluster in descending order of appearance frequency. A topic structurization determination device determines whether the topic can be structurized, by segmenting the topic cluster into subtopic clusters with reference to the number of documents, the variance of dates contained in the documents, or the C-value of keyword contained in the documents, as a determination criterion. And a keyword presentation device presents the characteristic keyword group in the subtopic cluster upon arranging the keyword group on the basis of the date information.

24 Claims, 11 Drawing Sheets

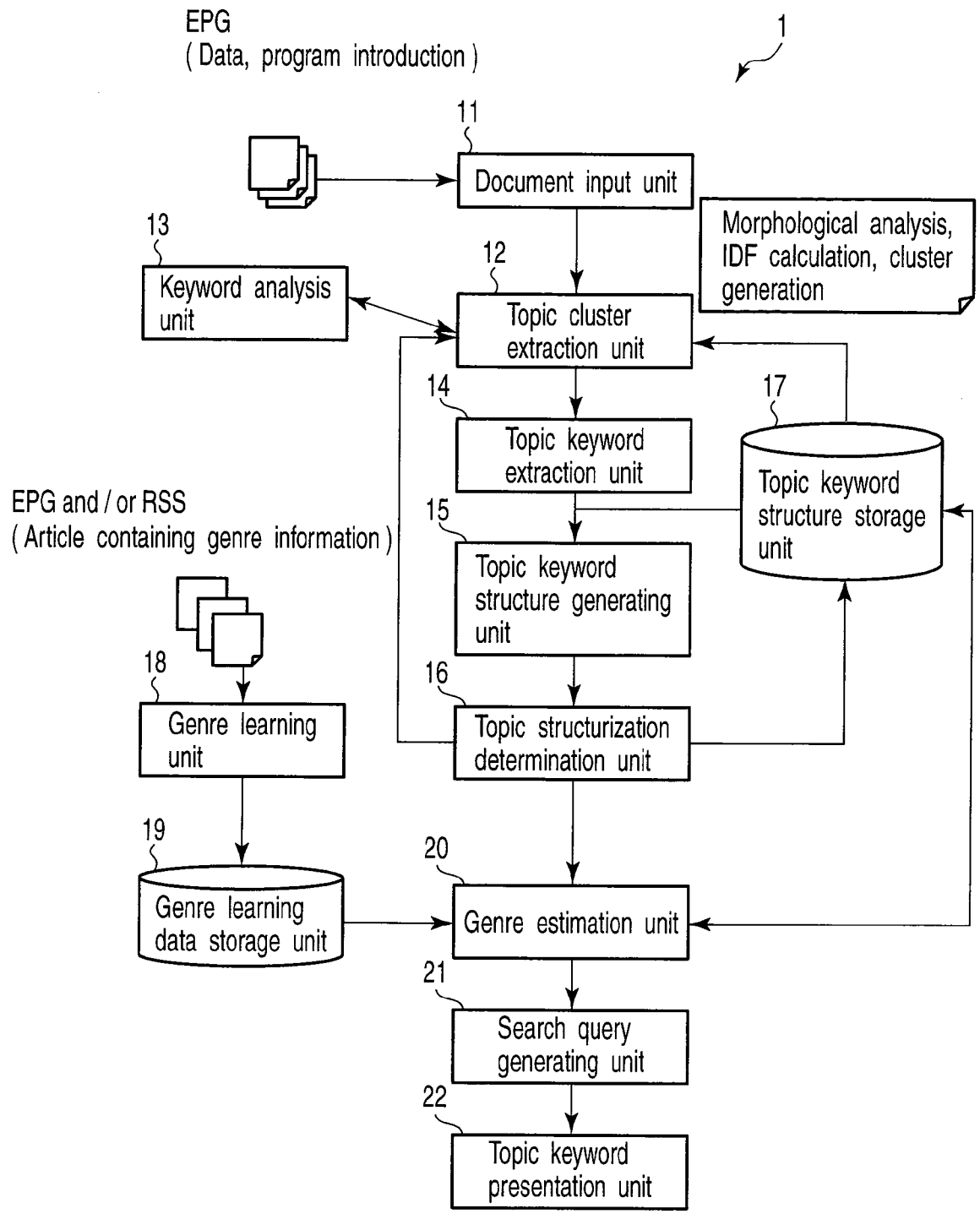
F I G. 3

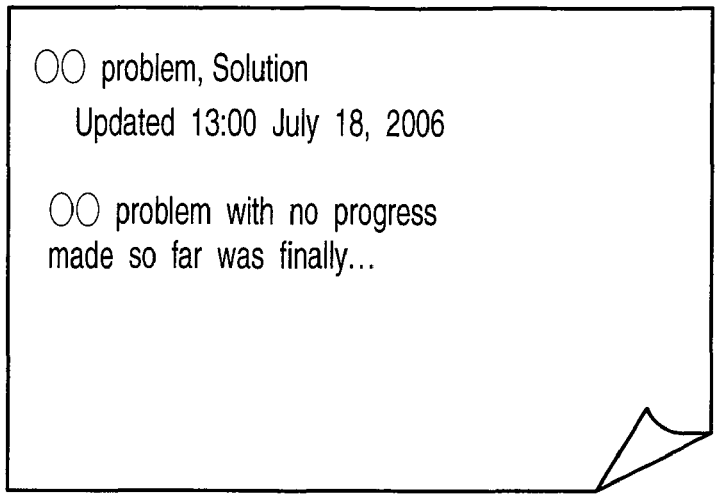
FIG. 4A
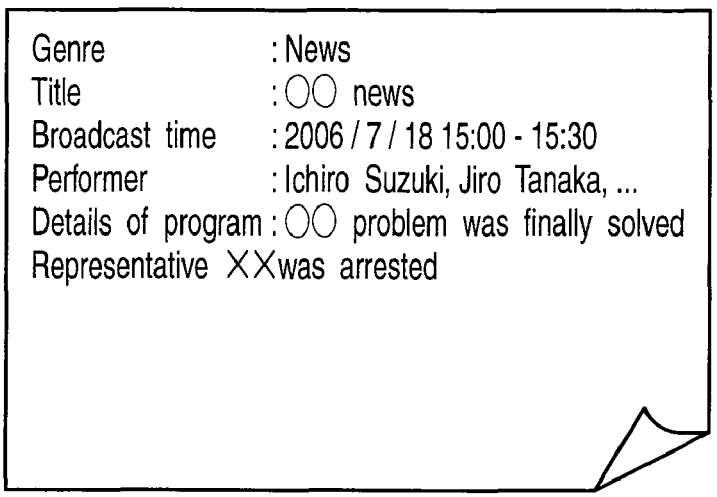
FIG. 4B
| Topic keyword | Period | Frequency | Source document ID |
|---|---|---|---|
| ○○ problem | 2006 / 7 / 11 - 2006 / 7 / 17 | 10 | 001, 003, ... |
| Arrest of ×× | 2006 / 7 / 11 - 2006 / 7 / 17 | 7 | 002, 003, ... |
| ... | | | |
FIG. 7

| Topic ID | Subtopic ID | Keyword | Headline / subheadline | Headline rank | Subheadline rank | New arrival | Period | Frequency | Genre | Sour document ID |
|---|---|---|---|---|---|---|---|---|---|---|
| A |  | ○○ problem | Headline | 1 |  | 0 | 2006/7/11 - 2006/7/17 | 10 | Society | 001, 003 ... |
| A | A1 | Suspicion | Subheadline |  | 1 | 0 | 2006/7/11 - 2006/7/17 | 7 | Society | 001, ... |
| A | A1 | Excuse | ... | ... | ... | ... | ... | ... | ... | ... |
| A | A2 | Apology | Sub-headline |  | 2 | 1 | 2006/7/11 - 2006/7/17 | 5 | Society | ... |
| A | A2 | Interview | ... | ... | ... | ... | ... | ... | ... | ... |
| B |  | Arrest of XX | Headline | 2 |  | 1 | 2006/7/11 - 2006/7/17 | 7 | Society | 001, 003 ... |
| B | B1 | Statement | Sub-headline |  | 1 | 1 | 2006/7/11 - 2006/7/17 | 5 | Society | ... |
| ... | ... | ... | ... | ... | ... | ... | ... | ... | ... | ... |
| B | B2 | △△ prefecture | Sub-headline |  | 2 | 0 | 2006/7/11 - 2006/7/17 | 3 | Society | ... |
| ... | ... | ... | ... | ... | ... | ... | ... | ... | ... | ... |
| B | B3 | Escape | Sub-headline |  | 3 | 0 | 2006/7/11 - 2006/7/17 | 3 | Society | ... |
| ... | ... | ... | ... | ... | ... | ... | ... | ... | ... | ... |

F I G. 9

Article keyword in 2006 / 07 / 18

No. 1 XX problem
└ Suspicion : Excuse ··· New ! Apology : Interview ···
No. 2 New ! Arrest of YY
└ New ! Statement : ··· ZZ prefecture : ··· Escape : ···
No. 3 ···

FIG. 11

Article keyword in 2006 / 07 / 18

Topic rapidly attracting attention
[ Football WW cup-★XX retired ]

Today's hot topics
↑ No. 1★ Arrest of YY
    └ ★ Statement ZZ prefecture
        Escape
↓ No. 2★ Italy vs France
    └ ★ No. 1 in world Battle
No. 3 ···

Currently watched topics
→No. 1★ AA problem
    └ ★ Apology Suspicion
↑ No. 2★ BB case
    └ ★ Arrest Facing difficulty
        Investigation Final battle today between Italy and France
Winner of battle between Italy and France

FIG. 12

KEYWORD OUTPUTTING APPARATUS AND METHOD

CROSS-REFERENCE TO RELATED APPLICATIONS

This application is based upon and claims the benefit of priority from prior Japanese Patent Application No. 2007-166714, filed Jun. 25, 2007, the entire contents of which are incorporated herein by reference.

BACKGROUND OF THE INVENTION

1. Field of the Invention

The present invention relates to an apparatus and a method for keyword outputting.

2. Description of the Related Art

There are strong needs to know popular topics and current event information. Various techniques to meet the needs have been developed. Among them, attention is paid to techniques of extracting current event keywords using document information to know topics or current event information. For example, in a Web search engine as a technique on the Web, attention is paid to the above techniques as techniques that allow to know needs for various kinds of information in the world in the form of search keywords and to known daily topics.

As a technique of extracting news which is a topic in a certain period, there is available a technique of displaying the rank information of keywords found on the Web. This technique generates search ranks on the basis of frequencies in a certain period, and displays, as the sign of a topic, a keyword commonly contained in entries recently added by a blog search engine or the like.

Kizasi.jp ("searched Jul. 26, 2006", Internet <URL: kizasi.jp/>), which is the Web site for finding a sign of change from an infinite number of words written in blogs, describes a technique of displaying currently hot keywords in accordance with the frequencies of keywords written in Web sites (known as blogs) on the Internet on which individuals post their diaries and remarks. A keyword presented by such a technique is a kind of keyword indicating current event information. In kizasi.jp, keywords indicating current event information can be presented for every predetermined time such as 24 hr, one week, or one month, in a rank form.

The keyword extraction method disclosed in JP-A No. 2001-325272 (KOKAI) attempts to present topics by clustering new words.

The homepage kizasi.jp also describes a technique of presenting not only keywords exhibiting high frequencies (keywords indicating current event information) for a predetermined period of time but also keywords associated with the keywords indicating the current event information. However, kizasi.jp is not configured to present information indicating how a given topic progresses upon presentation of the topic. That is, if there are a plurality of subtopics associated with one big topic, the above technique does not allow the user to know the kinds of subtopics included in the big topic and the times at which and the order in which they appear. Assume that "○○ injury case" is extracted as a keyword indicating current event information, and "case occurrence", "placed on wanted list", and "criminal arrest" are extracted as keywords associated with the keyword. The homepage kizasi.jp is not designed to control a display order in accordance with the newnesses and appearance periods of keywords or control keywords by visualizing the progression of a topic. For example, subtopics of the big topic "○○ injury case" can be seen as "case occurrence", "placed on wanted list", and "criminal arrest". In this case, these subtopics are preferably displayed in the order of "case occurrence→placed on wanted list→criminal arrest". However, kizasi.jp does not perform such display control. In the first place, the user cannot grasp that the keywords indicating the subtopics constituting the big topic "○○ injury case" are "case occurrence", "placed on wanted list", and "criminal arrest". It is therefore impossible to obtain a policy of how to determine a search query for searching for an appropriate news article from the Web.

The technique disclosed in JP-A No. 2001-325272 (KOKAI) performs clustering processing upon extraction of keywords. In some cases, therefore, no consideration is given to a context in which a keyword appears. As a consequence, the same keyword may be contained in a totally different topic.

BRIEF SUMMARY OF THE INVENTION

According to the present invention, there is provided a keyword outputting apparatus comprising: a document input device configured to input a plurality of documents having date information in a designated period; a keyword analysis device configured to obtain a plurality of word vectors represented by the documents by analyzing a plurality of keywords contained in each of the documents; a topic cluster extraction device configured to extract a pair of documents as a topic cluster from the documents, the pair of documents having a maximum inner product of the corresponding word vectors and belonging to an identical topic; a keyword extraction device configured to extract a predetermined number of keywords as a characteristic keyword group from the topic cluster in descending order of appearance frequency; a topic structurization determination device configured to determine whether the topic is configured to be structurized, by segmenting the topic cluster into subtopic clusters with reference to one of a number of the documents, a variance of dates contained in the documents, and a C-value of keyword in the documents, as a determination criterion; a control device configured to control the topic cluster extraction device to repeatedly extract a subtopic cluster until it is not determined that a subtopic of the subtopic cluster is not configured to be structurized, and to control the keyword extraction device to extract another characteristic keyword group from the extracted subtopic cluster; and a keyword presentation device configured to present the characteristic keyword group in the subtopic cluster upon arranging the keyword group on the basis of the date information.

BRIEF DESCRIPTION OF THE SEVERAL VIEWS OF THE DRAWING

FIG. 3 is a functional block diagram of the server;

FIG. 4A is a schematic view exemplarily showing a news article on a Web page on the Internet;

FIG. 4B is a schematic view exemplarily showing information on an EPG;

FIG. 7 is a schematic view showing the structure of a topic keyword list;

FIG. 9 is a schematic view showing an example of a topic keyword structure;

FIG. 11 is a view showing a display example of topic keywords;

FIG. 12 is a view showing another display example of topic keywords;

DETAILED DESCRIPTION OF THE INVENTION

Figure 1:
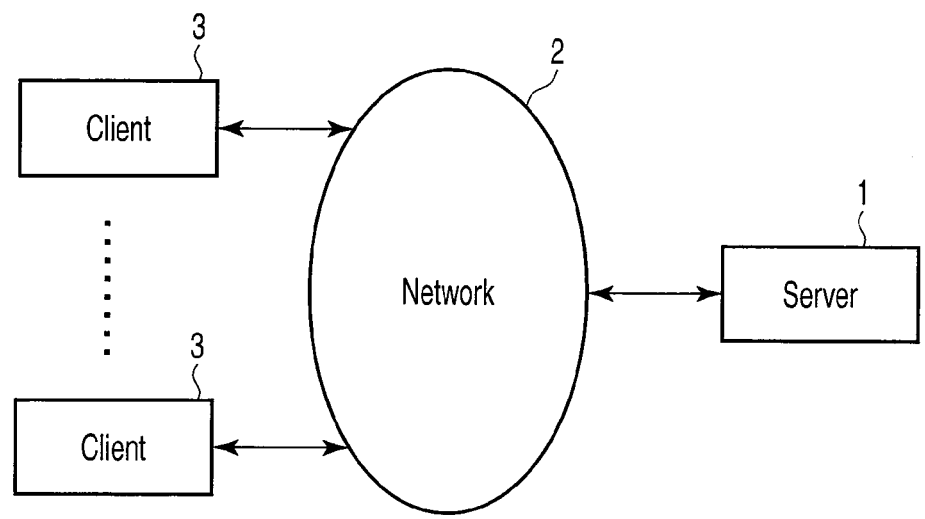
FIG. 1 is a schematic view showing an example of how a system including a keyword outputting apparatus according to an embodiment is constructed.

As shown in FIG. 1, a system including a keyword outputting apparatus according to an embodiment is assumed to be a server-client system in which a plurality of client computers (to be referred to as "clients" hereinafter) 3 are connected to a server computer (to be referred to as a "server" hereinafter) 1 as a keyword outputting apparatus via a network 2 such as a LAN (Local Area Network). The server 1 and the clients 3 are, for example, general personal computers.

Figure 2:
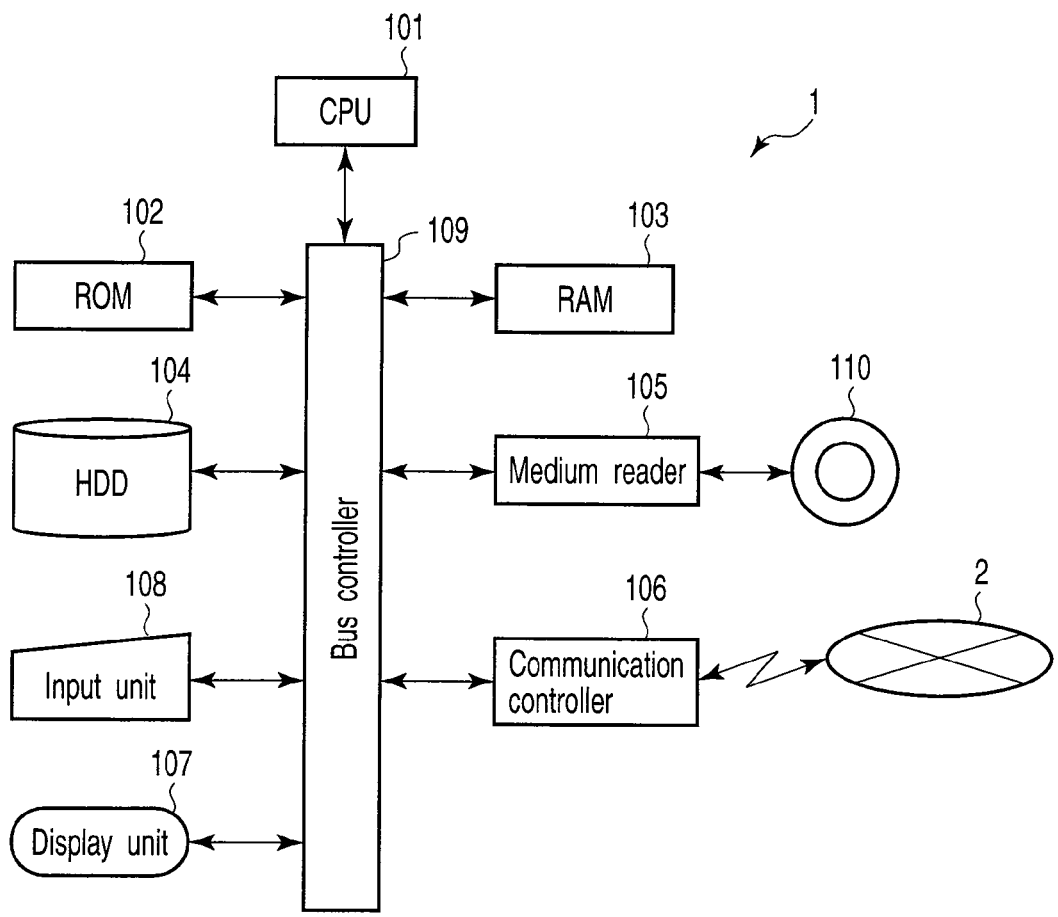
FIG. 2 is a block diagram showing the hardware arrangement of a server.

Referring to FIG. 2, the server 1 includes a CPU (Central Processing Unit) 101, a ROM (Read Only Memory) 102, a RAM (Random Access Memory) 103, an HDD (Hard Disk Drive) 104, a medium reader 105, a communication controller 106, a display unit 107, an input unit 108, and the like. The CPU 101 performs information processing. The ROM 102 is a read only memory storing a BIOS and the like. The RAM 103 rewritably stores various data. The HDD 104 functions as various types of databases and stores various types of programs. The medium reader 105 is, for example, a CD-ROM drive for saving information, distributing information to the outside, and acquiring information from the outside by using a storage medium 110. The communication controller 106 is used to transfer information to another computer via the network 2 by communication. The display unit 107 is, for example, a CRT (Cathode Ray Tube) or an LCD (Liquid Crystal Display) which displays the progression of processing, a processing result, and the like to the operator. The input unit 108 is, for example, a keyboard or a mouse which is used by the operator to input instructions, information, and the like to the CPU 101. A bus controller 109 arbitrates data to be transmitted and received between these components to make them operate.

When the user powers on the server 1 or the client 3, the CPU 101 activates a program called a loader in the ROM 102 to load a program called an OS (Operating System), which manages the hardware of the computer and software, from the HDD 104 into the RAM 103, and to activate the OS. Such an OS activates a program, read information, or save information in accordance with operation by the user. As a typical OS, Windows (registered trademark) is known. Operation programs running on such OSs are called application programs. Note that application programs are not limited to those running on a predetermined OS, and can be those which make the OS take over execution of part of each of various types of processing (to be described later) and those which are contained as some of program files constituting predetermined application software or an OS.

The server 1 stores a keyword outputting program as an application program in the HDD 104. In this sense, the HDD 104 functions as a storage medium storing the keyword outputting program.

In general, an application program installed in the HDD 104 of the server 1 is recorded on the storage medium 110 such as media of various schemes, e.g., various types of optical disks such as a CD-ROM and a DVD, various types of magnetooptical disks, various types of magnetic disks such as a flexible disk, and semiconductor memories. The operation program recorded on the storage medium 110 is installed in the HDD 104. For this reason, the portable storage medium 110 such as an optical information recording medium, e.g., a CD-ROM, or a magnetic medium, e.g., an FD can be a storage medium storing an application program. In addition, the application program can be acquired from the outside via the communication controller 106 and installed in the HDD 104.

In the server 1, when the keyword outputting program operating on the OS is activated, the CPU 101 intensively controls the respective components by executing various types of arithmetic processing. Of various types of arithmetic processing executed by the CPU 101 of the server 1, processing which is a characteristic feature of this embodiment will be described below.

As shown in FIG. 3, the server 1 includes a document input unit 11, a topic cluster extraction unit 12, a keyword analysis unit 13, a topic keyword extraction unit 14, a topic keyword structure generating unit 15, a topic structurization determination unit 16, a topic keyword structure storage unit 17, a genre learning unit 18, a genre learning data storage unit 19, a genre estimation unit 20, a search query generating unit 21, and a topic keyword presentation unit 22.

The topic keyword structure storage unit 17 may include any type of storage medium which is generally used, such as the HDD 104, the storage medium 110, or the RAM 103.

Each functional block will be described below. Note that data structures and processing sequences which constitute the respective functional blocks will be described later as needed.

The document input unit 11 inputs a plurality of documents having date information as attributes to obtain a document set corresponding to a period corresponding to a pre-designated number of days. Examples of documents having date information as attributes are a news article (see FIG. 4A) on a Web page on the Internet and information (see FIG. 4B) on an RSS (Rich Site Summary) or EPG (Electronic Program Guide). Every document needs to contain a text or date information as an attribute such as an update time. As a distribution source of such documents, data existing in a designated specific Web site or database is used. A news article (see FIG. 4A) on a Web page or information (see FIG. 4B) on an EPG is assigned a document ID which can uniquely identify each information.

The topic cluster extraction unit 12 extracts a cluster of documents belonging to the same topic from the documents corresponding to the designated period which are input to the document input unit 11 in accordance with the keywords analyzed by the keyword analysis unit 13. That is, upon receiving documents from the document input unit 11, the topic cluster extraction unit 12 temporarily transfers them to the keyword analysis unit 13. A conceivable method of generating a topic cluster is to repeat the operation of obtaining word vectors representing documents by using the keywords analyzed by the keyword analysis unit 13 and regarding a pair of documents corresponding to word vectors whose inner product is the maximum as a pair of documents belonging to the same topic, until the inner product value reaches a threshold. This makes it possible to obtain a topic cluster set.

The keyword analysis unit 13 receives a plurality of documents input by the document input unit 11 in a designated period, and analyzes representative keywords contained in a text on the Web or a text on an EPG by using an existing natural language processing technique (e.g., morphological analysis or n-gram analysis). For example, performing morphological analysis on the character string "natural language processing" can extract, for example, the words "natural", "language", and "processing" as keywords. In addition, the keyword analysis unit 13 assigns a weight to each keyword by using a TF (Term Frequency) or IDF (Inversed Document Frequency) calculated from the number of documents and the appearance frequency of the keyword. This technique is used for each element of the above word vector. The inner product value of the above word vectors is calculated by using the value indicated by each element. This embodiment describes the processing using a TF or IDF. However, it suffices to use a weighting means based on other parameters such as the distance between keywords which is based on the number of words or characters and the difference in appearance date between the respective words.

The topic keyword extraction unit 14 extracts, as topic keywords, keywords (characteristic headline keywords) frequently contained in the respective topic clusters extracted by the topic cluster extraction unit 12. It is necessary to set a reference indicating how long to extract a keyword. It is possible to use a technique such as C-value (K. Frantsi and S. Ananiadou, "Extracting Nested Collocations", in Proceedings of COLING-96, pp. 41-46, 1996).

The topic keyword structure generating unit 15 associates a plurality of topic keywords extracted by the topic keyword extraction unit 14 in accordance with the result obtained by the topic keyword structure storage unit 17 (to be described later) to structurize the topic keywords.

Figure 14:
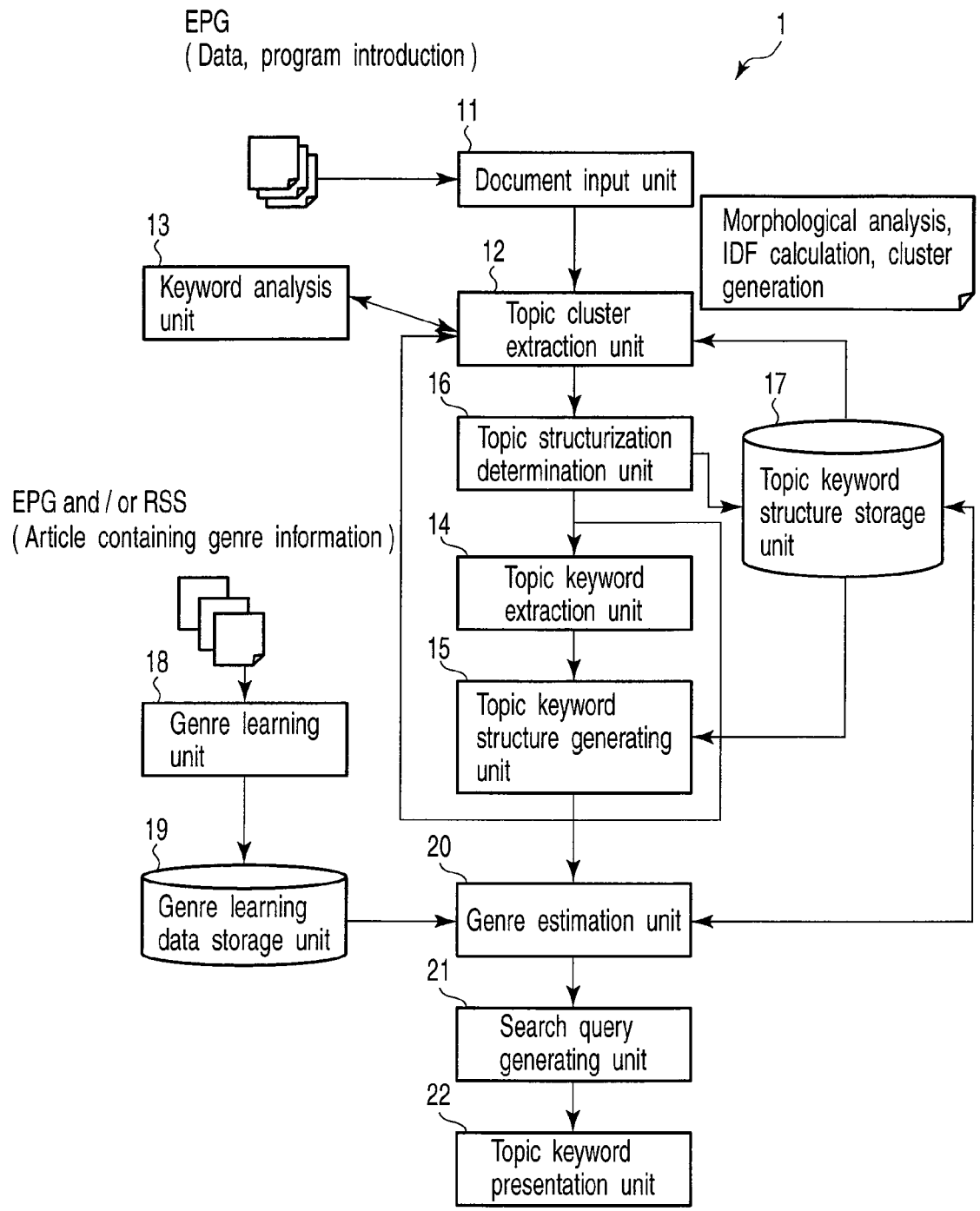
FIG. 14 is a functional block diagram of a server according to another embodiment.

The topic structurization determination unit 16 determines whether the topic indicated by each topic cluster can be further segmented. As a determination criterion, for example, it is possible to use the number of pieces of document information constituting a cluster, the variance of dates contained in document information, or the C-value of a keyword contained in document information. When the value exceeds the threshold, the determination unit 16 determines that this cluster can be segmented. In this case, the topic structurization determination unit 16 recursively executes processing by the topic cluster extraction unit 12 and the subsequent units for the cluster as a document set. That is, upon determining that the topic can be structurized, the topic structurization determination unit 16 controls the topic cluster extraction unit 12 to repeatedly extract a topic cluster until determining that the topic cannot be structurized, and also controls the topic keyword extraction unit 14 to extract a characteristic keyword group from the subtopic clusters of the topic cluster of subtopics extracted by the topic cluster extraction unit 12. In the recursive execution, as a means for properly segmenting a topic, the topic structurization determination unit 16 uses a method of segmenting a cluster without using a topic keyword on the basis of other keywords or a method of calculating a TF, IDF, or C-value again upon regarding articles constituting each cluster as a total set. Such segmentation determination can be applied to all the clusters at once or determination can be performed for each cluster. Referring to FIG. 3, only when determining by topic structurization determination that recursive processing can be performed, the topic structurization determination unit 16 performs clustering again. However, it suffices to determine, after clustering processing, whether each cluster is appropriate as a unit of a topic. FIG. 14 shows an arrangement for a case in which clustering processing is performed first. In this case, when only determining that the segmentation of the clustering result is appropriate, the topic structurization determination unit 16 stores the clustering result in the topic keyword structure storage unit 17. Otherwise, the clustering result is discarded.

The topic keyword structure storage unit 17 stores the current event keywords and their structure generated by the topic keyword structure generating unit 15. The current event keywords and their structure stored in the topic keyword structure storage unit 17 are referred to at the time of the subsequent execution of operation and segmentation of a topic cluster.

When the topic structurization determination unit 16 finishes all topic structurization processing, the genre estimation unit 20 attaches genre information to all the topic keywords or all topic clusters stored in the topic keyword structure storage unit 17. Genre estimation is performed to classify keywords according to predetermined n genres (including "undeterminable" and "others"). Keywords are classified into genres determined as appropriate by a method like the k-NN (k-nearest neighbor) method or the SVM (Support Vector Machine) method. As will be described later, as data necessary for genre estimation, the data learnt by the genre learning unit 18 and stored in the genre learning data storage unit 19 is used. The topic keyword structure storage unit 17 stores the genre estimation result.

The genre learning unit 18 receives EPG or RSS document information each comprising a pair of genre information and a document, and calculates, as a weight, information indicating that a given keyword contained in each document "tends to be contained in a specific genre" or "does not tend to be contained in a specific genre". The genre learning data storage unit 19 stores the calculation result.

The search query generating unit 21 generates a Web page in which search queries for search by a search engine on the Internet are embedded on the basis of the topic keywords and their structure generated by the topic keyword structure generating unit 15 and genre information.

The topic keyword presentation unit 22 presents the Web page generated by the search query generating unit 21 in accordance with the display request issued from the client 3 used by each user via the network 2.

Topic cluster extraction processing by the topic cluster extraction unit 12 and the keyword analysis unit 13, of the processing executed by the CPU 101 of the server 1 in accordance with the keyword outputting program, will be described next with reference to the flowchart of FIG. 5.

Figure 5:
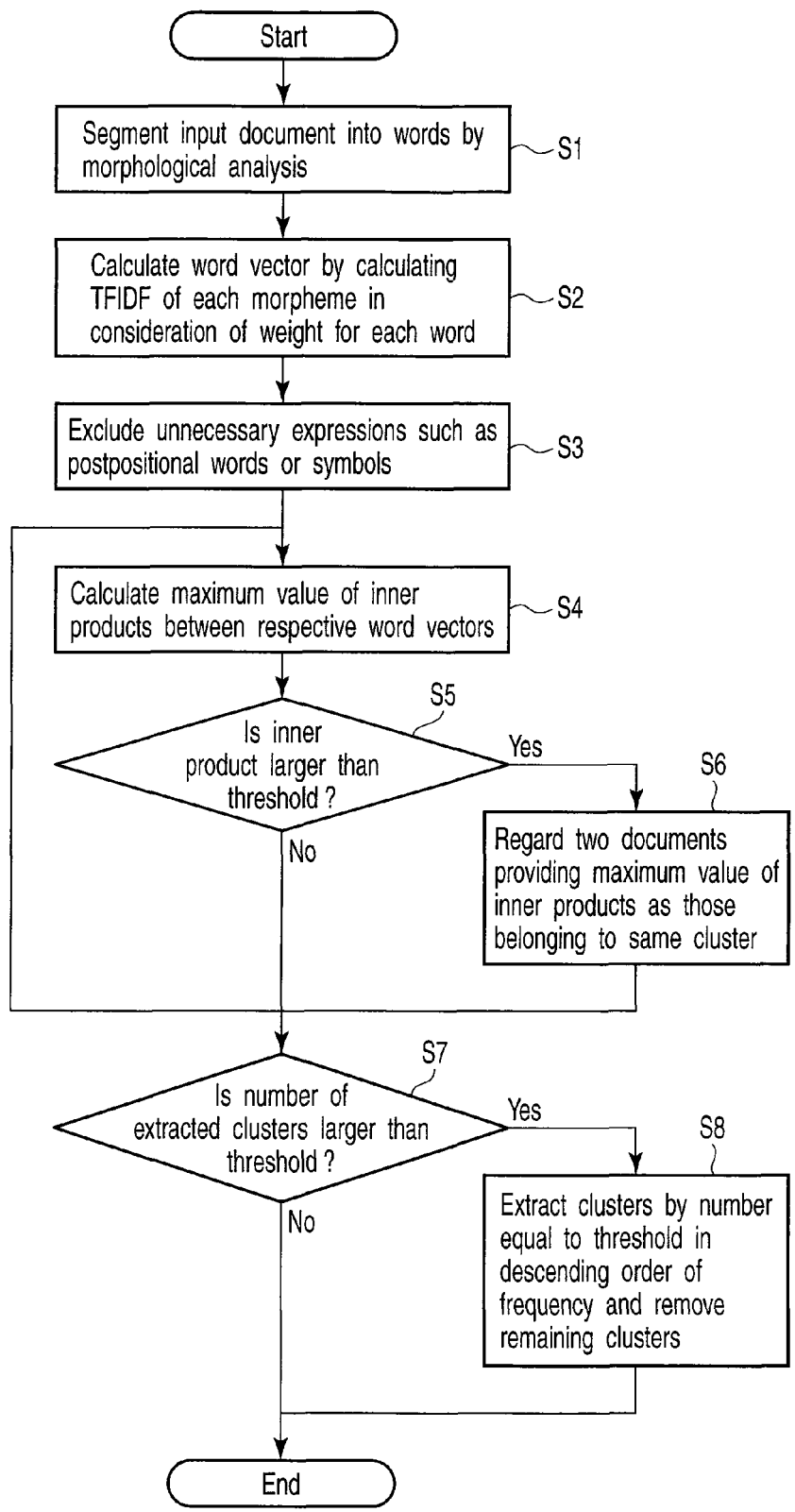
FIG. 5 is a flowchart showing a sequence for topic cluster extraction processing.

As shown in FIG. 5, first of all, the keyword analysis unit 13 segments one document into a plurality of words by performing morphological analysis on each of a plurality of documents input via the document input unit 11 in a designated period (step S1).

The keyword analysis unit 13 then generates word vectors for each document in consideration of the weights of the respective words by calculating the TF-IDF value of each segmented morpheme (step S2).

The keyword analysis unit 13 excludes unnecessary expressions such as postpositional words and symbols, which are not used as keywords, from the word vectors generated in step S2 (step S3).

The keyword analysis unit 13 performs the processing described so far, and returns the word list as the analysis result to the topic cluster extraction unit 12.

The topic cluster extraction unit 12 calculates the inner products of the respective word vectors in the word list returned to the topic cluster extraction unit 12, and calculates the maximum value of the calculated inner products (step S4). The topic cluster extraction unit 12 then determines whether the calculated value exceeds a threshold (step S5).

In this embodiment, the topic cluster extraction unit 12 calculates scores by using appearance frequencies as attributes of a document set or keywords themselves. However, the present invention is not limited to this. It suffices to calculate scores by using attributes of keywords themselves in a document set such as the lengths of the keywords or morphological information.

If the maximum value of the inner products of the word vectors is larger than the threshold (YES in step S5), the two documents which provide the maximum value can be regarded as those belonging to the same cluster (step S6). The processing in step S4 is repeatedly executed.

If the maximum value of the inner products of the word vectors is equal to or less than the threshold (NO in step S5), the clustering processing is terminated, and it is determined whether the number of clusters is larger than a threshold (step S7). If the number of clusters is larger than the threshold, clusters are left by a number equal to the threshold in descending order of frequency, and the rest is removed (step S8). Topic clusters are provided by the processing described so far.

A processing sequence for extracting keywords indicating a topic from each topic cluster in the topic keyword extraction unit 14 will be described next with reference to the flowchart of FIG. 6.

Figure 6:
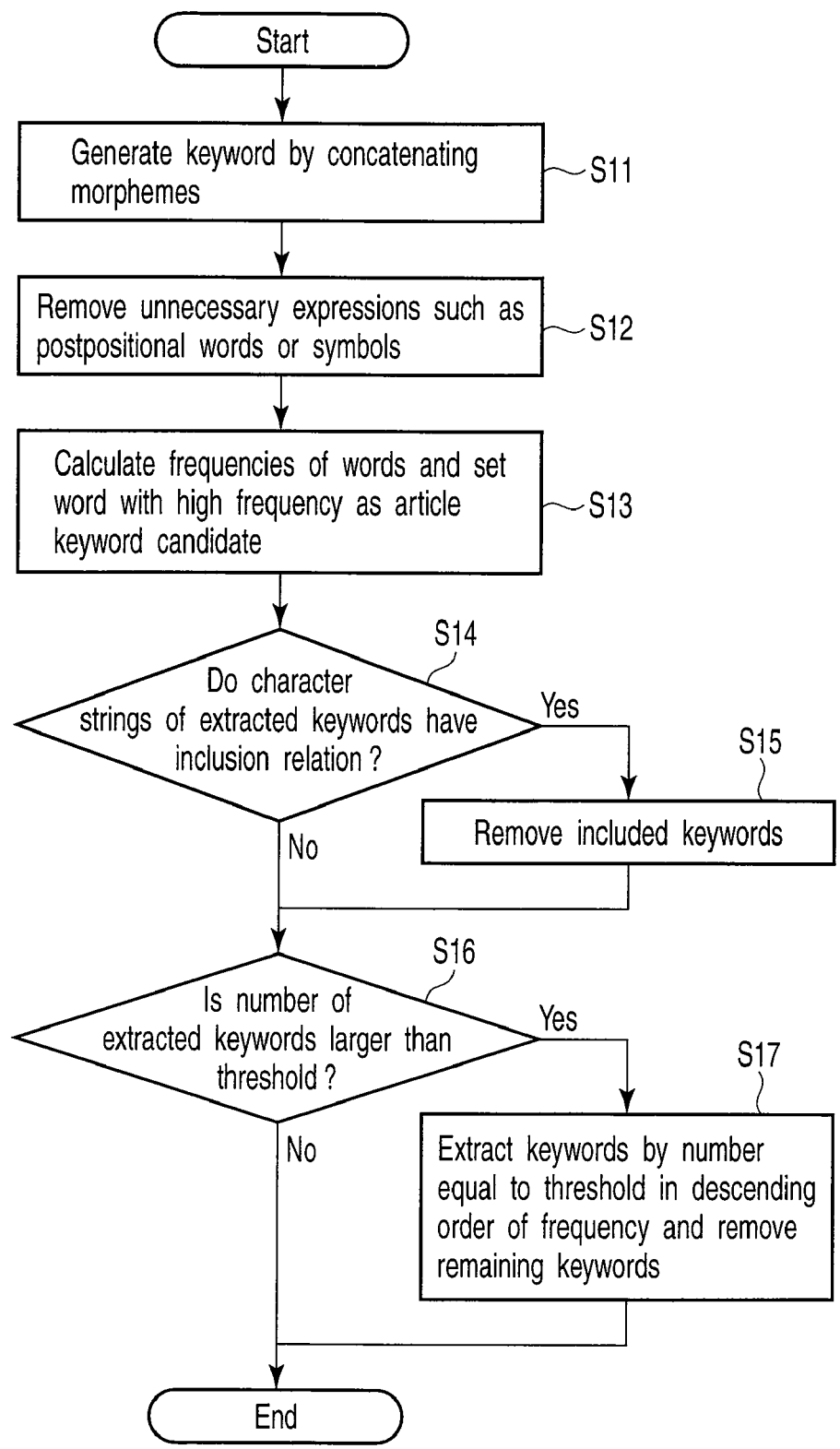
FIG. 6 is a flowchart showing a sequence for keyword extraction processing.

As shown in FIG. 6, the topic keyword extraction unit 14 generates a keyword candidate comprising two or more words by concatenating a plurality of morphemes (step S11).

The topic keyword extraction unit 14 removes unnecessary expressions such as postpositional words and symbols, which are not used as keywords, from the keyword candidates generated in step S11 (step S12).

The topic keyword extraction unit 14 sets keywords as current event keyword candidates in descending order of appearance frequency (step S13), and determines whether the keywords extracted as candidates have an inclusion relation (step S14).

The topic keyword extraction unit 14 calculates the appearance frequencies of keywords by also using the history of the appearance frequencies of keywords calculated in the past. Assume that the history of the appearance frequencies of keywords calculated in the past is associated with the keywords stored in the topic keyword structure storage unit 17.

In this embodiment, the topic keyword extraction unit 14 calculates scores by using the appearance frequencies of keywords in a document set, which are attributes of the keywords themselves. However, the present invention is not limited to this. It suffices to calculate scores by using attributes of keywords themselves in a document set, e.g., the lengths or morphological information of the keywords.

If the character strings of keywords have an inclusion relation (YES in step S14), the topic keyword extraction unit 14 removes the included keywords (step S15). Consider a case in which the character strings of keywords have an inclusion relation. Consider, for example, the keywords "XX problem", "XX", and "problem". In this case, since "XX problem", "XX", and "problem" have an inclusion relation, the topic keyword extraction unit 14 removes the included keywords "XX" and "problem" in step S15.

If the character strings of keywords do not have an inclusion relation (NO in step S14), the process directly advances to step S16.

That is, the topic keyword extraction unit 14 extracts keywords by using the inclusion relation between the respective keywords analyzed by the keyword analysis unit 13.

The keyword list obtained in this manner becomes a topic keyword set. If the number of extracted keywords is larger than a predetermined threshold (YES in step S16), keywords are used by a number equal to the threshold in descending order of frequency, and the rest is removed (step S17). With the above operation, a predetermined number of characteristic topic keywords can be obtained from a topic cluster.

FIG. 7 is a schematic view showing the structure of an extracted topic keyword list. As shown in FIG. 7, each obtained current event keyword includes a designated period, an appearance frequency, and the ID of an appearance source document as attributes as well as the character string of the keyword itself.

If the topic structurization determination unit 16 determines that a topic can be segmented, the topic indicated by each topic cluster segmented by the topic cluster extraction unit 12 will be referred to as a "subtopic". In addition, a keyword serving as a headline of a subtopic will be referred to as a "subtopic keyword". Structurization processing for topic keywords and subtopic keywords in the topic keyword structure generating unit 15 will be described with reference to the flowchart of FIG. 8.

Figure 8:
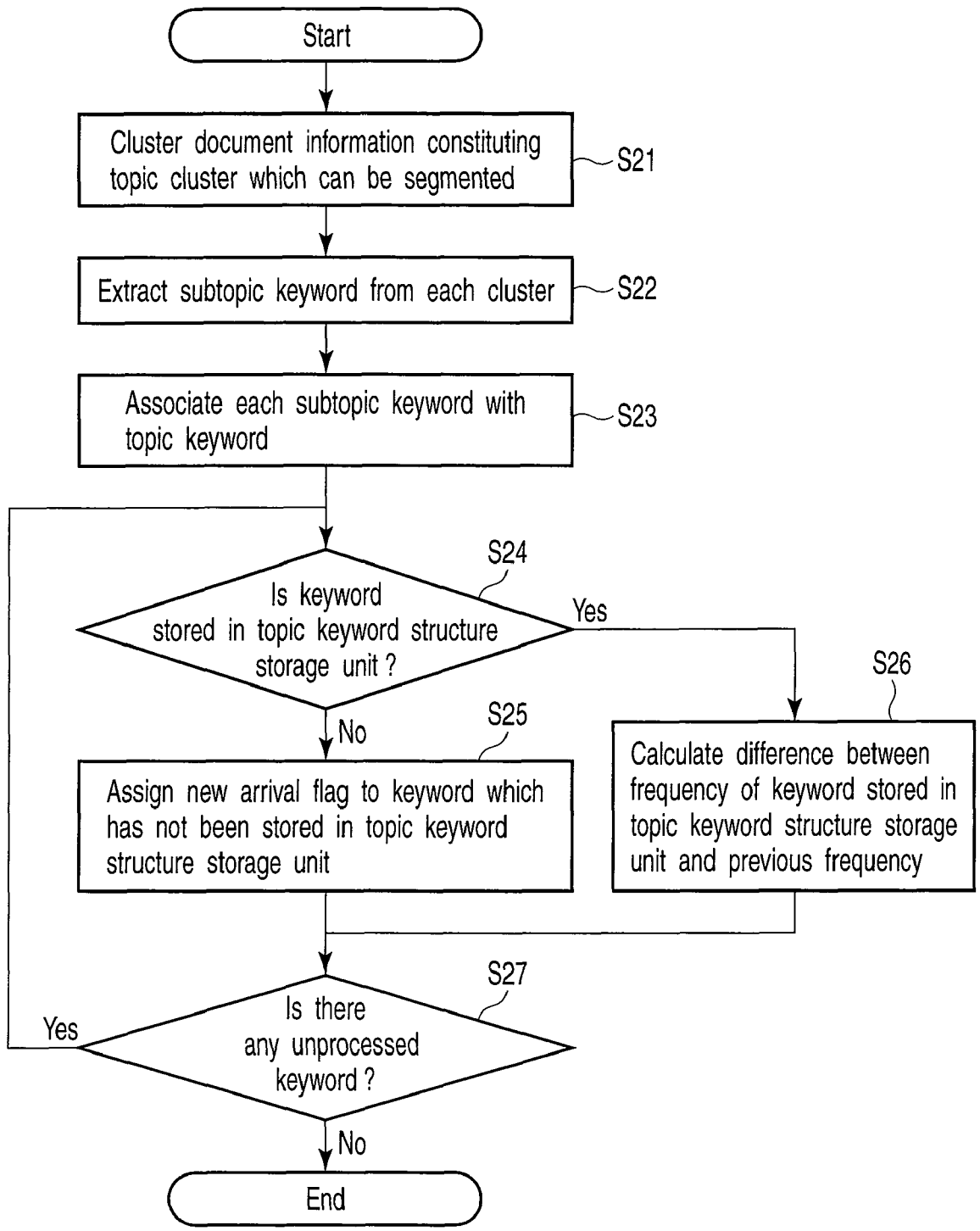
FIG. 8 is a flowchart showing a sequence for topic keyword structurization processing.

As shown in FIG. 8, first of all, the topic keyword structure generating unit 15 receives a document forming a topic cluster which can be segmented, and performs clustering by using the topic cluster extraction unit 12 (step S21). At this time, the topic keyword structure generating unit 15 does not include topic keywords constituting the topic cluster itself for calculation (step S21). The topic keyword structure generating unit 15 also uses the proximity of dates for calculation such that subtopics that have appeared on neighboring days tend to belong to the same cluster.

The topic keyword structure generating unit 15 then causes the topic keyword extraction unit 14 to extract subtopic keywords from the subtopic cluster obtained as a result of the above operation (step S22).

The topic keyword structure generating unit 15 sets each of the obtained subtopic keyword groups as a subheadline, and associates it with a topic keyword (headline) indicating a topic cluster before segmentation (step S23). The discrimination between a headline and a subheadline is reflected in the display at the time of keyword presentation (to be described later).

The topic keyword structure generating unit 15 classifies and hierarchizes keywords by using cooccurrence information based on the commonality of the appearance source documents of the keywords.

Subsequently, the topic keyword structure generating unit 15 determines whether each keyword is stored in the topic keyword structure storage unit 17 (step S24). The topic keyword structure generating unit 15 attaches a new arrival flag to a keyword which is not stored in the topic keyword structure storage unit 17 (NO in step S24) (step S25), and calculates the difference between the appearance frequency of each keyword which has already been stored in the topic keyword structure storage unit 17 (YES in step S24) and the previous appearance frequency (step S26). That is, the topic keyword structure generating unit 15 determines by comparison with a keyword stored in the topic keyword structure storage unit 17 whether the keyword was extracted in the past, and determines by this determination that the keyword is a keyword that has newly arrived, thereby attaching an attribute (new arrival flag) indicating new arrival to the keyword.

The above processing in steps S24 to S26 is repeated until there is no unprocessed keyword (NO in step S27).

FIG. 9 shows an example of the keyword structure obtained as a result of the above processing. Each topic keyword is assigned the discrimination between a headline and a subheadline, the rank of the headline/subheadline, the presence/absence of a new arrival flag, the difference in rank between adjacent days, and a genre, in addition to a topic ID, a subtopic ID, and attributes (a designated period, an appearance frequency, and the ID of an appearance source document) added at the time of topic keyword extraction. A "difference in rank between adjacent days" is assigned to only a headline with "new arrival" of "0" (i.e., a keyword that allows comparison in rank between adjacent days). In addition, if, for example, a given keyword that was displayed as a subheadline on the previous day is promoted to a headline, the headline is handled as "new arrival". Note that the attributes of a keyword are not limited to those shown in FIG. 9. For example, the attribute "promotion" indicating that the keyword is promoted from a subheadline to a headline can be added. Any genre is not added to the keyword at this point of time, and will be calculated later by the genre estimation unit 20.

That is, the topic keyword structure generating unit 15 assign an attribute to a keyword by comparing with the score (e.g., the appearance frequency or the like) of the keyword which was calculated in the past.

Figure 10:
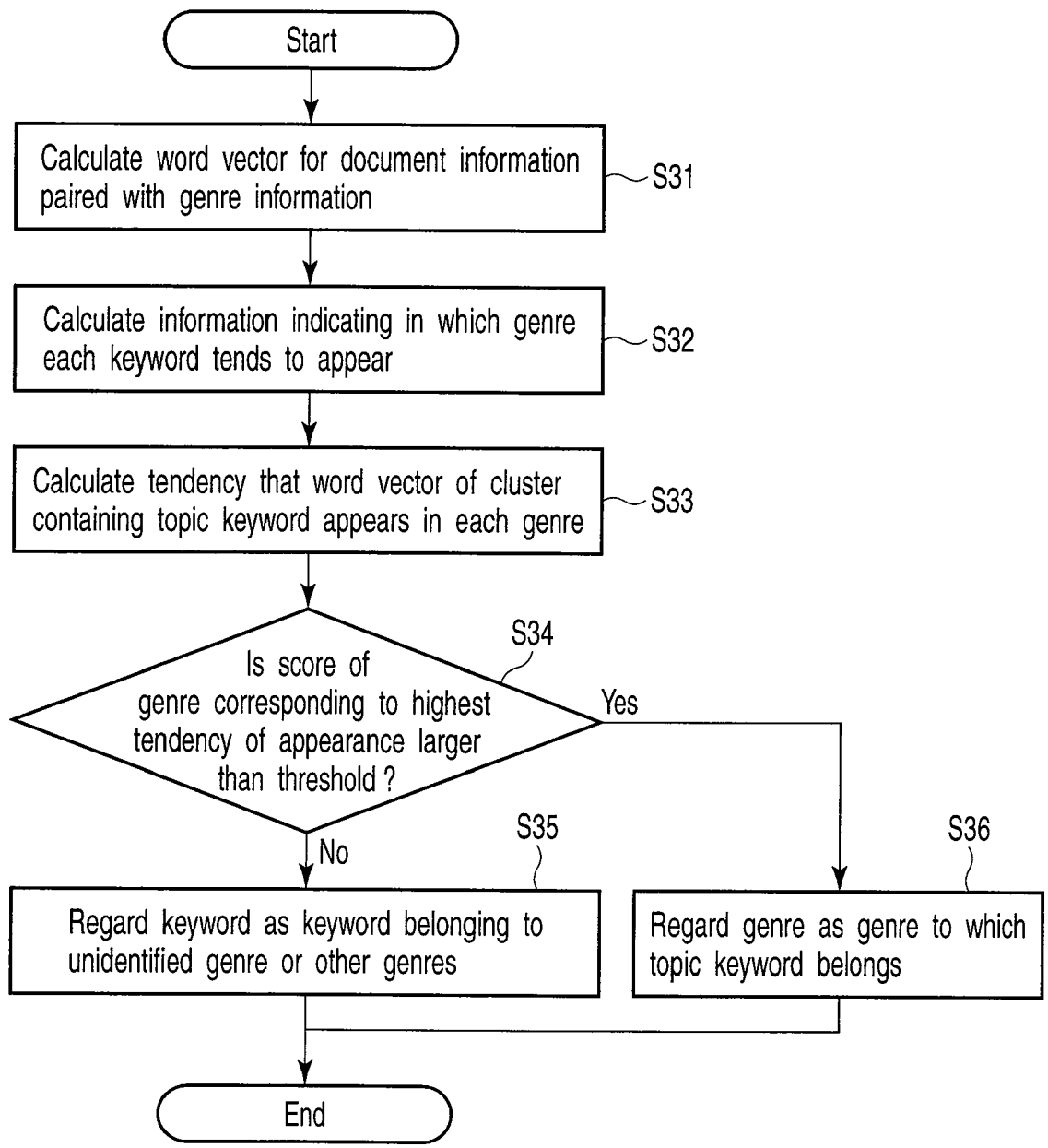
FIG. 10 is a flowchart showing a sequence for genre estimation processing.

Genre estimation processing in the genre estimation unit 20 will be described next. This sequence will be described with reference to FIG. 10. First of all, the genre learning unit 18 calculates word vectors of a document paired with genre information (step 31). The genre estimation unit 20 then calculates the tendency of appearance of each keyword in a specific genre. This information can be obtained by calculating the appearance ratio of each keyword for each genre (step S32). The genre learning data storage unit 19 stores this result.

When calculating information indicating in which genre each topic keyword is contained, the genre estimation unit 20 calculates a score for each genre by calculating the inner product between a word vector of a cluster containing each topic keyword and a word vector attached with, as a weight, the appearance ratio of each keyword in a target genre stored in the genre learning data storage unit 19 (step 33). The genre estimation unit 20 determines whether the maximum value of these scores is equal to or more than a threshold (step 34). If the maximum value exceeds the threshold, the corresponding genre is regarded as a genre to which the topic keyword belongs. If the maximum value does not exceed the threshold, since it indicates that the keyword cannot be classified to a genre, the keyword is regarded as "genre unidentified" or "other genres". In any case, the result is reflected in the topic keyword structure storage unit 17.

The search query generating unit 21 adds a search query to each of the topic keywords which are structurized (classified and hierarchized) in the above manner before each topic keyword is presented to the user. For each topic, each topic keyword or information obtained by concatenating all topic keywords with "AND" or "OR" is added as a search query. For each subtopic, "AND" between a topic keyword indicating a subordinate topic and a topic keyword indicating a subtopic or information obtained by concatenating all topic keywords indicating the subtopic with "AND" or "OR" is formed as a search query. With regard to a broad keyword such as "XX problem" which is a source topic, therefore, it can be expected to obtain a search result in a context more defined by keywords such as "suspicion" and "apology". That is, The search query generating unit 21 generates a search query by combining a plurality of search keywords in accordance with the keyword structure generated by the topic keyword structure generating unit 15. Note that when generating a query, "AND" is used to obtain as accurate a result as possible, and "OR" is used to obtain as many results as possible. Alternatively, a standard query like "news" may be added to obtain a news article as a search result. That is, the search query generating unit 21 can attach a pre-designated specific keyword string. In addition, the search query generating unit 21 can change a query in accordance with the genre to which each topic keyword belongs. For example, if the genre is "sports", for example, a search target can be limited to sports newspaper sites.

A Web browser on the client 3 used by each user allows to view a Web page containing a search query generated by the search query generating unit 21 on the basis of the topic keywords and their structure which are generated by the topic keyword structure generating unit 15.

As is obvious from the display example of topic keywords shown in FIG. 11, the topic keywords as headlines are displayed in accordance with the ranks of scores shown in FIG. 9. Subheadlines are displayed in a hierarchical structure associated with the headlines. The subheadlines are arranged and displayed in the order based on the ranks of scores shown in FIG. 9. Such an order based on the ranks of scores tends to appear as a temporal change in a designated period. A temporal change in a designated period corresponds to, for example, the current situation of the topic information of headlines. In addition, using a character or icon ("New!" in FIG. 11) for a newly-arrived headline makes it possible to provide a difference in display effect. That is, the topic keyword presentation unit 22 displays marks such as icons, symbols, or display effects which allow to recognize the presence of attributes in accordance with the presence/absence or types of attributes.

In addition, as shown in FIG. 11, each topic keyword is an anchor text and is associated with a search site on the Web via a hyperlink. When the user clicks a topic keyword, the current page is moved to a search result list page on a search site on the Web by the search query added to the topic keyword. That is, each topic keyword is a query to a search engine on the Web, and hence the user can easily acquire topic information such a news without inputting any keyword using the keyboard. This can save the trouble of making a search by inputting a combination of keywords.

FIG. 12 is a view showing another display example of topic keywords. The display example shown in FIG. 12 is designed to extract a topic keyword from two types of keyword sets, i.e., a short-term keyword set and a long-term keyword set, at the time of input of a document, so as to display the topic generated from the short-term keyword set in a field A "today's hot topics" and display information obtained by removing short-term keyword set from the long-term keyword set in a field B "currently watched topics", thereby allowing to present keywords in accordance with different periods.

Note that displaying an icon or arrow indicating a change in rank in accordance with a variation in rank for a displayed topic keyword allows the user to know a change in the attention degree of the topic indicated by the keyword. Referring to FIG. 12, "star" attached to a newly-arrived topic keyword allows the user to know that the keyword has newly arrived.

Referring to FIG. 12, a keyword whose appearance frequency has rapidly increased is displayed in a field C "topic rapidly attracting attention" regardless of the rank. This allows the user to know a keyword which has rapidly attracted attention.

In addition, consider the display order of subheadlines. Preferentially arranging subheadlines attached with new arrival flags instead of simply arranging subheadlines in descending order of frequency can present display with high topicality to the user. That is, the topic keyword presentation unit 22 changes the display order in accordance with the presence/absence or type of an attribute.

In some cases, the user cannot understand the meaning of a keyword by only seeing it. The display example shown in FIG. 12 allows the user to know a context by displaying source document data in which a keyword has appeared without opening the search site. That is, the topic keyword presentation unit 22 displays a source document containing a topic keyword when the user performs predetermined operation. Referring to FIG. 12, when the user places a mouse pointer P on a keyword, source document data D in which the keyword has appeared is displayed. This makes it possible to immediately know how the keyword "battle" is used.

Figure 13:
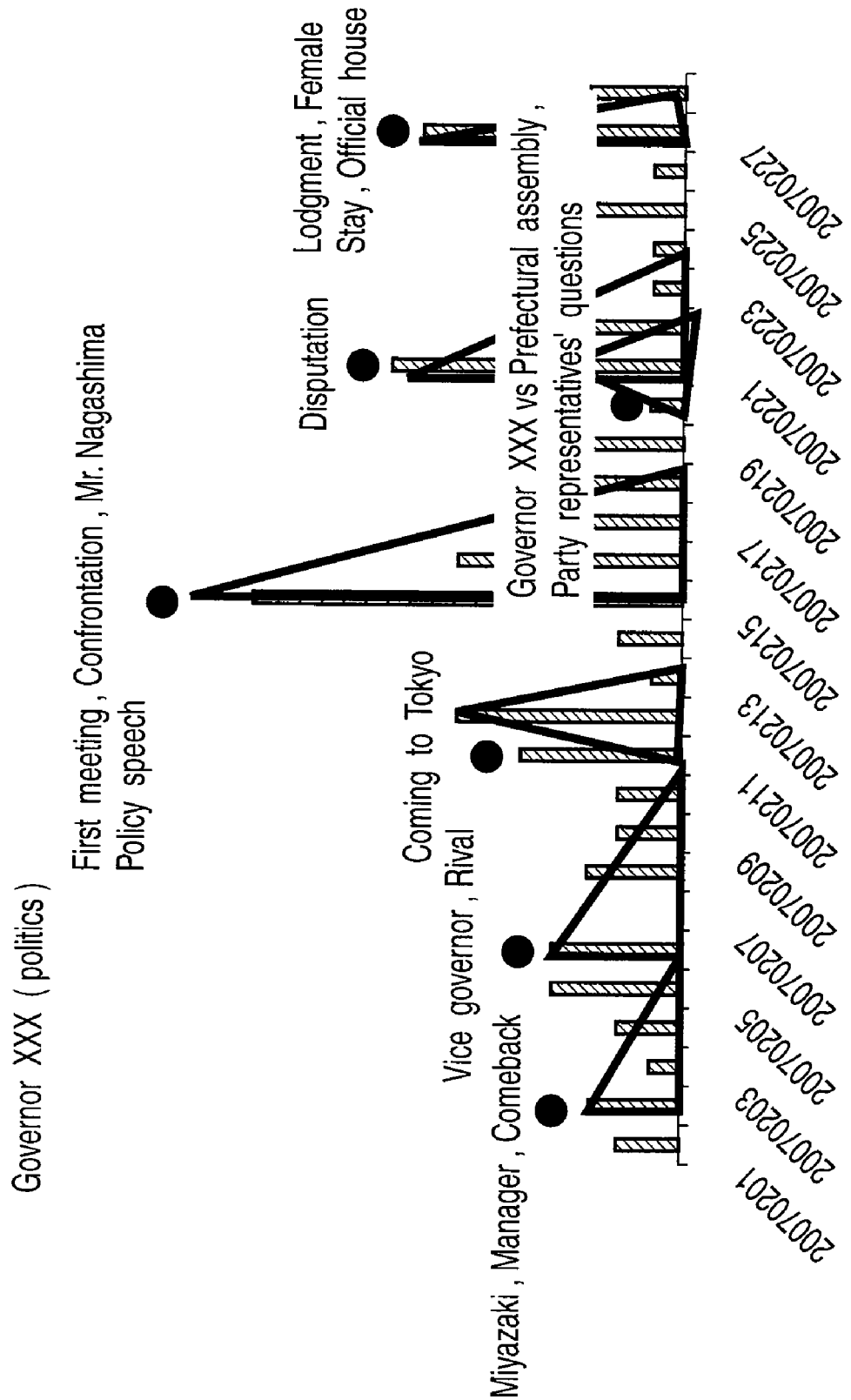
FIG. 13 is a view showing still another display example of topic keywords.

FIG. 13 is a view showing still another display example of topic keywords. The display example shown in FIG. 13 displays the sizes of clusters containing topic keywords in the form of a graph and also displays the dates when subtopic keywords have appeared, thereby expressing the tendency of topic keywords in the form of the relation between subtopics. When indicating how long a given subtopic has continued, a graphic pattern indicating a duration is superimposed on the corresponding portion, as shown in FIG. 13. It suffices to always display this graphic pattern or display it only when the user selects a graph, a topic, or a subtopic. The numerical values displayed in a display graph are not limited to the sizes of clusters. It suffices to display any numerical values representing associated attributes such as the appearance frequencies of topic keywords. Although a bar graph is used in FIG. 13, it suffices to use another form of graph such as a line graph. In addition, displaying genre information for each topic keyword allows the user to know the specific genre to which each topic belongs. With regard to genres, as shown in FIG. 13, genre information can be added to each topic or each subtopic. In practice, a given topic may cross over a plurality of genres. In such a case, classifying each subtopic to a genre can easily express the difference in genre. When the user places the mouse pointer on each keyword, the source document data in which the keyword has appeared can be displayed in the same manner as shown in FIG. 12. Likewise, it suffices to display an icon or arrow indicating a change in rank in accordance with a variation in rank with respect to a displayed topic keyword so as to allow the user to know a change in the attention degree of the topic indicated by the keyword. In addition, it suffices to attach "star" to a newly-arrived topic keyword so as to allow the user to know that the keyword has newly arrived.

According to the embodiment described above, a keyword structure is generated by analyzing keywords contained in a plurality of documents input in a designated period and classifying and hierarchizing the respective keywords extracted in the order of the scores of the keywords. The respective keywords are then classified and hierarchized in accordance with the keyword structure. The classified and hierarchized keywords are presented upon being arranged in the order of scores. This makes it possible to effectively detect and present a topic keyword as a keyword indicating topic information on a given date and time from a document having date information as an attribute. In addition, presenting the classified and hierarchized keywords upon arranging them in the order of scores can present the user information indicating a temporal change of a given topic keyword in a designated period from the arrangement order of hierarchized and associated keywords, e.g., information indicating the current situation of the corresponding topic information. More specifically, this can effectively present the user the progression or state of the topic, i.e., "what has happened to the ○○ case as a current topic", instead of only displaying "current topic".

That is, this embodiment records document information which can be acquired from the program information of daily distributed TV programs and the Web, calculates the frequency and newness of each keyword to indicate how the keyword has appeared, and generates headline information to know a topic keyword. This makes it possible for the user to easily understand which keyword is currently a topic, and how long the topic indicted by the keyword has continued, and to easily make a search.

In addition, reusing a keyword structure as a past processing result allows the user to know changes in the appearance frequencies and ranks of a newly-arrived keyword and keyword. Reflecting the result in the display contents allows the user to easily know the situation of a topic indicated by a headline and a combination of latest keywords.

In this embodiment, the search query generating unit 21 adds a search query to each keyword before making the topic keyword presentation unit 22 present each keyword. However, the present invention is not limited to this. For example, when the user selects each keyword presented by the topic keyword presentation unit 22, the search query generating unit 21 may add a search query to the selected keyword.

In addition, in this embodiment, the topic keyword presentation unit 22 presents the web page generated by the search query generating unit 21 in accordance with the display request issued from the client 3 used by each user via the network 2. However, the present invention is not limited to this. For example, it suffices to download the Web page onto the client 3 used by each user and display a local file.

Although this embodiment is based on the server client system in which a plurality of clients 3 are connected to the server 1 as the keyword outputting apparatus via the network 2, the present invention is not limited to this. The present invention can be applied to a case in which the keyword outputting apparatus is used as a stand-alone apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A keyword outputting apparatus comprising:
   a document input device configured to input a plurality of documents having date information in a designated period;
   a keyword analysis device configured to obtain a plurality of word vectors represented by the documents by analyzing a plurality of keywords contained in each of the documents;
   a topic cluster extraction device configured to extract a pair of documents as a topic cluster from said documents, the pair of documents having a maximum inner product of the corresponding word vectors and belonging to an identical topic;
   a keyword extraction device configured to extract a predetermined number of keywords as a characteristic keyword group from the topic cluster in descending order of appearance frequency;
   a topic structurization determination device configured to determine whether the topic is configured to be structurized, by segmenting the topic cluster into subtopic clusters with reference to one of a number of the documents, a variance of dates contained in the documents, and a C-value of keyword in the documents, as a determination criterion;

a control device configured to control the topic cluster extraction device to repeatedly extract a subtopic cluster until it is not determined that a subtopic of the subtopic cluster is not configured to be structurized, and to control the keyword extraction device to extract another characteristic keyword group from the extracted subtopic cluster; and a keyword presentation device configured to present the characteristic keyword group in the subtopic cluster upon arranging the keyword group on the basis of the date information.

2. An apparatus according to claim 1, further comprising a keyword structurization device configured to structurize keywords by classifying or hierarchizing keyword groups of the topic cluster and the subtopic cluster.

3. An apparatus according to claim 2, wherein the keyword structurization device classifies and hierarchizes the keyword group by using cooccurrence information based on commonality of an appearance source documents of keywords.

4. An apparatus according to claim 1, further comprising a genre estimation device configured to estimate a genre of one of the topic cluster and the subtopic cluster and attach a genre name thereto.

5. An apparatus according to claim 1, further comprising a search query generating device configured to generate a search query on the basis of a keyword group of one of the topic cluster and the subtopic cluster.

6. An apparatus according to claim 5, wherein when a keyword is selected from a keyword group presented by the keyword presentation device, the search query is assigned to the keyword.

7. An apparatus according to claim 5, which further comprises a device configured to structurize keywords by classifying or hierarchizing keyword groups of the topic cluster and the subtopic cluster, and in which
the search query generating device generates a search query by combining a plurality of keywords by using a structurization result of the keywords.

8. An apparatus according to claim 5, wherein the search query generating device attaches a pre-designated specific keyword string.

9. An apparatus according to claim 5, which further comprises a genre estimation device configured to estimate a genre of one of the topic cluster and the subtopic cluster and assign a genre name thereto, and in which
the search query generating device switches search query generating methods in accordance with the genre name estimated by the genre estimation device.

10. An apparatus according to claim 1, further comprising a keyword storage device configured to store a keyword group extracted by the keyword extraction device together with a score of each keyword.

11. An apparatus according to claim 10, wherein the topic cluster extraction device calculates scores at the time of extraction of the topic cluster by also using a history of scores stored in the keyword storage device.

12. An apparatus according to claim 10, wherein an attribute is assigned to said each keyword by comparing scores of the respective keywords stored in the keyword storage device.

13. An apparatus according to claim 12, wherein in accordance with one of presence/absence and a type of the attribute, the keyword presentation device displays a mark which makes the attribute identifiable.

14. An apparatus according to claim 12, wherein the keyword presentation device changes a display order of the keyword group in accordance with one of presence/absence and a type of the attribute.

15. An apparatus according to claim 10, wherein an attribute indicating that a keyword has newly arrived is assigned to the newly-arrived keyword determined by comparing with a keyword stored in the keyword storage device.

16. An apparatus according to claim 1, wherein a document input to the document input device is a news article of a Web page on the Internet.

17. An apparatus according to claim 1, wherein a document input to the document input device is information contained in an electronic program guide (EPG).

18. An apparatus according to claim 1, wherein a document set contained in at least one designated period is input to the document input device.

19. An apparatus according to claim 1, wherein the keyword extraction device calculates a score based on an attribute of a keyword.

20. An apparatus according to claim 19, wherein the score is an appearance frequency of the keyword.

21. An apparatus according to claim 1, wherein the keyword extraction device extracts the keyword group by using an inclusion relation between keywords.

22. An apparatus according to claim 1, wherein the keyword presentation device comprises a display device which displays a document containing the keyword in response to predetermined operation for a keyword.

23. A non-transitory computer readable storage medium storing instructions of a computer program which when executed by a computer results in performance of steps comprising:
inputting a plurality of documents having date information in a designated period;
obtaining a plurality of word vectors represented by the documents by analyzing a plurality of keywords contained in each of the documents;
extracting a pair of documents as a topic cluster from said documents, the pair of documents having a maximum inner product of the corresponding word vectors and belonging to an identical topic;
extracting a predetermined number of keywords as a characteristic keyword group from the topic cluster in descending order of appearance frequency;
determining whether the topic is configured to be structurized, by segmenting the topic cluster into subtopic clusters with reference to one of a number of the documents, a variance of dates contained in the documents, and a C-value of keyword in the documents, as a determination criterion;
performing control to repeatedly extract a subtopic cluster until it is not determined that a subtopic of the subtopic cluster is not configured to be structurized, and to extract another characteristic keyword group from the extracted subtopic cluster; and
presenting the characteristic keyword group in the subtopic cluster upon arranging the keyword group on the basis of the date information.

24. A keyword outputting method comprising:
inputting a plurality of documents having date information in a designated period;
obtaining a plurality of word vectors represented by the documents by analyzing a plurality of keywords contained in each of the documents;
extracting a pair of documents as a topic cluster from said documents, the pair of documents having a maximum inner product of the corresponding word vectors and belonging to an identical topic;

extracting a predetermined number of keywords as a characteristic keyword group from the topic cluster in descending order of appearance frequency;

determining whether the topic is configured to be structurized, by segmenting the topic cluster into subtopic clusters with reference to one of a number of the documents, a variance of dates contained in the documents, and a C-value of keyword in the documents, as a determination criterion;

performing control to repeatedly extract a subtopic cluster until it is not determined that a subtopic of the subtopic cluster is not configured to be structurized, and to extract another characteristic keyword group from the extracted subtopic cluster; and presenting the characteristic keyword group in the subtopic cluster upon arranging the keyword group on the basis of the date information.

* * * * *